United States Patent [19]

Zaiki

[11] Patent Number: 5,230,053
[45] Date of Patent: Jul. 20, 1993

[54] PROCESSOR SCHEDULING METHOD FOR ITERATIVE LOOPS

[75] Inventor: Koji Zaiki, Osaka, Japan

[73] Assignee: Matsushita Electric Industrial Co., Ltd., Osaka, Japan

[21] Appl. No.: 650,819

[22] Filed: Feb. 5, 1991

[30] Foreign Application Priority Data

Feb. 5, 1990 [JP] Japan .................. 2-25380

[51] Int. Cl.[5] .............................. G06F 9/06
[52] U.S. Cl. .................. 395/700; 364/DIG. 1; 364/280.5
[58] Field of Search ............ 364/DIG. 1; 395/700

[56] References Cited

U.S. PATENT DOCUMENTS

| | | | |
|---|---|---|---|
| 4,686,623 | 8/1987 | Wallace | 395/700 |
| 4,807,126 | 2/1989 | Gotou et al. | 395/700 |
| 4,833,606 | 5/1989 | Iwasawa et al. | 395/700 |
| 5,109,331 | 4/1992 | Ishida et al. | 364/DIG. 1 X |
| 5,267,068 | 11/1992 | Iwasawa et al. | 364/DIG. 1 X |

OTHER PUBLICATIONS

"Advanced Compiler Optimizations for Supercomputers" by David A. Padua et al.; Communications of the ACM; Dec. 1986 vol. 29 No. 12.

*Primary Examiner*—Thomas M. Heckler
*Attorney, Agent, or Firm*—Lowe, Price, LeBlanc & Becker

[57] ABSTRACT

A compiling method is described whereby a source program written in a conventional high-language for execution by a serial architecture computer can be automatically converted to an object program for parallel execution by a multi-processor computer, without intervention by a programmer. Single loops or nested loops in source program are detected, and where possible are coded for concurrent execution of the outermost loop, with loop interchange in a nested loop, or fission of a loop into a plurality of adjacent loops being performed if necessary to enable concurrentization.

4 Claims, 13 Drawing Sheets

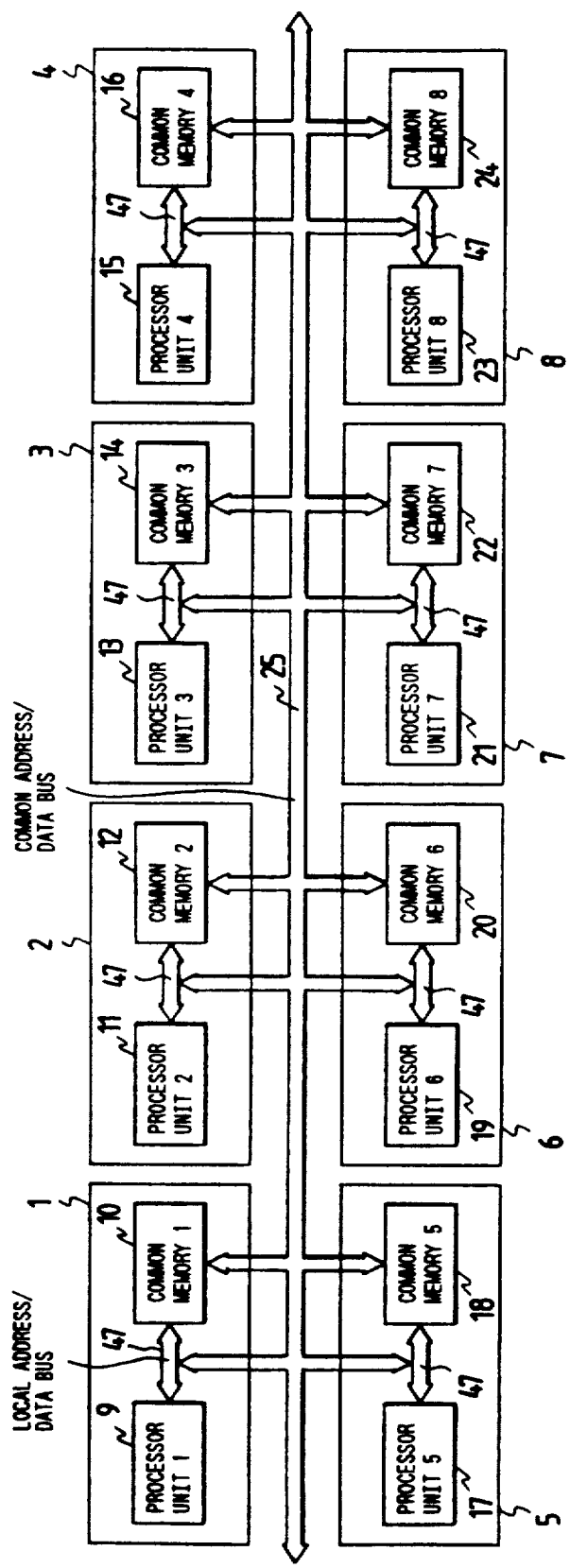

FIG. 3

(1) EXECUTED BY PROCESSOR 1
```
      C(1) = 0.0
      DO 20 J = 1,8
      C(1) = C(1) + A(1,J) * B(J)
20    CONTINUE
```

(2) EXECUTED BY PROCESSOR 2
```
      C(2) = 0.0
      DO 20 J = 1,8
      C(2) = C(2) + A(2,J) * B(J)
20    CONTINUE
```

(3) EXECUTED BY PROCESSOR 3
```
      C(3) = 0.0
      DO 20 J = 1,8
      C(3) = C(3) + A(3,J) * B(J)
20    CONTINUE
```

(4) EXECUTED BY PROCESSOR 4
```
      C(4) = 0.0
      DO 20 J = 1,8
      C(4) = C(4) + A(4,J) * B(J)
20    CONTINUE
```

(5) EXECUTED BY PROCESSOR 5
```
      C(5) = 0.0
      DO 20 J = 1,8
      C(5) = C(5) + A(5,J) * B(J)
20    CONTINUE
```

(6) EXECUTED BY PROCESSOR 6
```
      C(6) = 0.0
      DO 20 J = 1,8
      C(6) = C(6) + A(6,J) * B(J)
20    CONTINUE
```

(7) EXECUTED BY PROCESSOR 7
```
      C(7) = 0.0
      DO 20 J = 1,8
      C(7) = C(7) + A(7,J) * B(J)
20    CONTINUE
```

(8) EXECUTED BY PROCESSOR 8
```
      C(8) = 0.0
      DO 20 J = 1,8
      C(8) = C(8) + A(8,J) * B(J)
20    CONTINUE
```

(DEFINITION, REFERENCE)

S1 : A = B + C
S2 : D = A + 2.0
S3 : E = A * 3.0

(REFERENCE, DEFINITION)

S1 : A = B + C
S2 : B = D/2.0

(DEFINITION, DEFINITION)

S1 : A = B + C
S2 : D = A + 2.0
S3 : A = E + F

FIG. 11A
FOR EXTERNAL LOOP
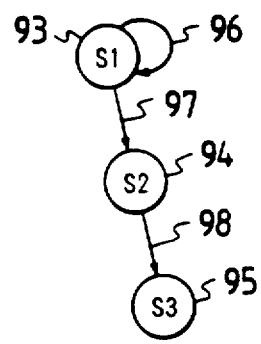
FIG. 11B
FOR INTERNAL LOOP
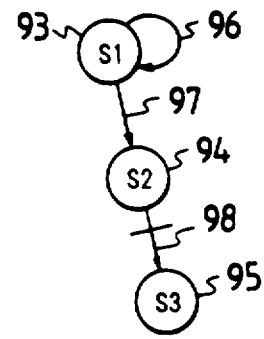
FIG. 12A
FOR EXTERNAL LOOP
$$\begin{bmatrix} 1 & 1 & 0 \\ 0 & 0 & 1 \\ 0 & 0 & 0 \end{bmatrix}$$
FIG. 12B
FOR INTERNAL LOOP
$$\begin{bmatrix} 1 & 1 & 0 \\ 0 & 0 & 1 \\ 0 & 0 & 0 \end{bmatrix}$$

FIG. 13A

FOR EXTERNAL LOOP $$\begin{bmatrix} < & = & 0 \\ 0 & 0 & < \\ 0 & 0 & 0 \end{bmatrix} \text{55}$$

$$\begin{bmatrix} = & = & 0 \\ 0 & 0 & < \\ 0 & 0 & 0 \end{bmatrix} \text{56}$$

$$\begin{bmatrix} < & = & 0 \\ 0 & 0 & = \\ 0 & 0 & 0 \end{bmatrix} \text{57}$$

FIG. 13B

FOR INTERNAL LOOP $$\begin{bmatrix} = & = & 0 \\ 0 & 0 & = \\ 0 & 0 & 0 \end{bmatrix} \text{58}$$

$$\begin{bmatrix} < & = & 0 \\ 0 & 0 & - \\ 0 & 0 & 0 \end{bmatrix} \text{59}$$

$$\begin{bmatrix} = & = & 0 \\ 0 & 0 & < \\ 0 & 0 & 0 \end{bmatrix} \text{60}$$

```
PARALLEL DO J = 1, N , K = 1, N
     A(N, J, K) = 0
     DO 10 I = N-1, 1, -1
        A(I, J, K) = B(I, J, K) * A(I+1, J, K) + C(I, J, K)
10   CONTINUE
END PARALLEL DO
```

PROCESSOR SCHEDULING METHOD FOR ITERATIVE LOOPS

BACKGROUND OF THE INVENTION

Field of Applicable Technology

The present invention relates to a method of implementing a concurrentization type of compiler, for converting a source program written in non-concurrent form to an object program that can be executed by a parallel-processing multiprocessor computer.

FIG. 1 is a simple block diagram illustrating an example of a multiprocessor computer which is made up of a set of eight processor modules designated by reference numerals 1 to 8 respectively. Each of the processor modules includes a processor unit and a common memory, i.e. the first processor module 1 includes a processor unit 9 and a common memory 10, the second processor module includes a processor unit 11 and a common memory 2, . . . and the processor module 8 includes a processor unit 23 and a common memory 24. The processor modules 1 to 8 further include respective local address/data buses 26 to 33 as shown, each of which communicates with a common address/data bus 25, while the common address/data bus 25 also communicates directly with each of the common memories 10 to 24. Thus, data or addresses can be transferred within each processor module between the processor unit and the common memory of that processor module, over the local address/data bus of the processor module, and also between each processor unit and any of the processor units of other processor modules, via the common address/data bus 25.

FIG. 2 shows an example of a portion of a computer program written in FORTRAN language for execution by a serial-operation computer, for repetitively obtaining the sum of a vector C and the product of a matrix A and a vector B, and storing the result as the vector C. The program portion is a nested loop, i.e. an outer DO loop designated by numeral 48 and an inner DO loop 49. The outer loop 48 has a total of 8 iterations (determined by the index I). With a serial-processing type of computer it is necessary to execute these iterations successively, however it is possible, using the multiprocessor computer of FIG. 1 for example, to execute these iterations in parallel, i.e. by assigning the iterations of the outer loop 48 to be executed concurrently by respective ones of the processor modules 1 to 8 in FIG. 1. That is to say, each processor module would be assigned a specific one of the values 1 to 8 of the index I, and would execute a corresponding 8 iterations of the inner loop 49 (i.e. for successive values of the index J) using that value of the index I.

Such concurrent execution is illustrated in the sections (1) to (8) of FIG. 3, which are respectively executed by the processor modules 1 to 8 in FIG. 1. As shown, the processor module 1 executes the inner loop inner loop 49 of the program of FIG. 2 using the value 1 for the index I. In parallel with that, the processor modules 2 to 8 execute that inner loop 49, using the respective values 2 to 8 for the index I, so that the iterations of the outer loop 48 are being executed in parallel.

It should be noted that the term "parallel" as used herein, e.g. in referring to "parallel execution" or "parallel code" relates only to concurrent processing by the processors of a multiprocessor computer, and does not relate to vector computation.

In order to achieve such parallel operation, it is necessary to generate program code for each of the processor modules. It may be possible to do this using the same types of program language that have been used for conventional serial computers. However it has become possible to use special high-level program language, as illustrated for example in FIG. 4, whereby the user can directly specify that parallel execution is to be applied to particular portions of a program. That is to say the "PARALLEL DO" instruction in this example designates that the iterations of the outer loop 50 (corresponding to the outer loop 48 of the program of FIG. 2) are to be assigned to respective processors of a multiprocessor computer, to be executed concurrently. Thus when the programmer decides that a portion of a program is suitable for parallel execution, such specialized statements can be inserted into the program as required, i.e. the programmer can manually concurrentize the program.

However with such a method, it is necessary for the programmer to always take into consideration the possibility that parallel execution may be possible, when writing the program, and must also take into consideration the architecture of the particular type of multiprocessor computer for which the program is being written. These factors make the process of writing a program for use with a multiprocessor computer more complex than is the case for a non-concurrent type of program, resulting in a low efficiency of software development, even when such a specialized high-level language for a parallel architecture computer is used.

In addition, very large amounts of software have been already developed for use with serial architecture computers, i.e. written in a high-level language such as conventional FORTRAN. If such software is to be concurrentized for use with a multiprocessor computer, then due to the very large volume of software it will not be practical to carry out such adaptation by means of programmers modifying each serial-architecture program. The meaning of the term "compiling" is sometimes limited to signifying the conversion of a program written in a high-level language such as FORTRAN to machine language. However as used herein, the term "concurrentization compiling" signifies the conversion of a source program that is written in a form for execution by a serial-processing computer to an object program which can be executed by a multiprocessor computer, with concurrent execution of appropriate portions of the program by the multiprocessor computer. The term "object program which can be executed by a multiprocessor computer" as used herein can signify a program in machine code for a multiprocessor computer, or a program written in a high-level language which includes special concurrent-processing control statements (such as the FORTRAN "parallel-DO" statement), and which can be directly converted to machine code for processing by a multiprocessor computer by using a suitable compiler.

SUMMARY OF THE INVENTION

It is an objective of the present invention to overcome the disadvantages described hereinabove, by providing a a concurrentization compiling method whereby an object program for execution by a multiprocessor computer can be automatically generated from a source program that has been written for execution by a serial architecture computer. Thus, the invention provides a method of implementing a compiler whereby it is not necessary for a programmer who prepares the source program to be aware that the object program which will be generated is to be executed by a multiprocessor computer.

To achieve the above objective, the present invention provides a compiler method for generating from a source program an object program to be executed by a multiprocessor computer, including successive steps of analyzing program elements of the source program, a step of analyzing the syntax of the source program based on results obtained from the step of analyzing program elements to thereby generate intermediate code, a parallelism detection step of analyzing the intermediate code to detect program loops and to judge whether concurrent execution of a detected program loop is possible, and a coding step for generating code of the object program in accordance with results obtained in the parallelism detection step, in which the parallelism detection step comprises successive steps of:

(a) judging whether a detected program loop is a nested loop, and, if a nested loop is found;

(b) analyzing data dependence relationships within the nested loop to judge if parallel execution of iterations of an outermost loop of the nested loop is possible;

(c) if parallel processing is found to be impossible, analyzing data dependence relationships within an inner loop of the nested loop to determine if the concurrent execution would be made possible by interchange of the inner loop and outermost loop; and (d) if it is judged that parallel processing would be made possible by the loop interchanging, analyzing data dependence relationships of the inner loop to judge whether it is possible to perform the loop interchanging, and if so, performing the loop interchanging.

The invention moreover provides a compiling method in which the step (b) of judging whether parallel execution is possible comprises successive steps of:

(e) judging whether parallel execution is made impossible due to the presence of any program statement between an initial loop control statement of an outermost loop of the nested loop and a succeeding loop control statement of an inner loop that is closest to the outermost loop;

(f) if parallel execution is judged to be possible in step (e), judging whether a condition of independence of data relationships between the inner loop and the outermost loop exists, which makes possible the parallel execution.

Moreover if it is found as a result of any of the above steps (b), (c) and (d) that parallel execution is not possible, a step is executed of judging whether it is possible to divide an outermost loop of the nested loop into a plurality of adjacent loops, and if such dividing is judged to be possible, a step of dividing into the adjacent loops is executed, followed by executing each of the above steps (b), (c) and (d) for each of the resultant adjacent loops That is to say, each loop is examined to judge whether concurrent execution is possible directly, or by modifying the structure of the loop.

Thus with the compiling method of the present invention, data dependence relationships within a program that is written in a serial-architecture programming language are analyzed, and for each loop which occurs in the program, processing is executed which may consist of one or more of the following:

(a) Loop interchanging, i.e. interchanging the outermost loop with an inner loop (in the case of a nested loop), and (b) Loop fission, i.e. splitting the loop into a plurality of adjacent loops, referred to in the following as blocks.

Before such loop interchanging or loop fission is performed, a check is made as to whether that can be done without affecting the data dependence relationships within the loop. This enables concurrentization of portions of the program to be performed, where appropriate, without destruction of data dependence relationships. The invention thus enable such processing of a serial-architecture program to be performed automatically by the compiler, so that it is not necessary for a programmer to be aware that a program is to be written for concurrent multiprocessor computer use. Moreover, existing software that has been written for a serial architecture computer does not need to be modified by a programmer (e.g. using a special multiprocessor language as mentioned hereinabove) in order to obtain a source program to be executed by a multiprocessor computer, i.e. concurrentization of such existing software can be executed automatically simply by submitting the software to a compiler that operates in accordance with the method of the present invention.

BRIEF DESCRIPTION OF THE DRAWINGS

FIG. 1 is a block diagram of an example of a multiple-processor computer for parallel processing;

FIG. 2 is an example of a nested loop in a FORTRAN program;

FIG. 3 is a diagram for describing parallel processing of the loop of FIG. 2 by the computer of FIG. 1;

FIG. 4 is an example of the nested loop program portion of FIG. 2 coded in a special high-level language for parallel processing by a multi-processor computer;

FIGS. 11A and 11B are data dependency graphs for the external loop and internal loop respectively of the nested loop example of FIG. 6A;

FIG. 12A shows a data referencing order matrix which applies to the outer loops of each of the program loop examples of FIGS. 6A, 6B and 6C, and FIG. 12B shows a data referencing direction matrix which applies to the inner loops of each these program loop examples;

FIG. 13A shows respective data referencing direction matrixes for the outer loops of the program loop examples of FIGS. 6A, 6B and 6C, and FIG. 13B shows respective data referencing direction matrixes for the inner loops of each these program loop examples;

FIGS. 16 and 17 illustrate the conversion of a nested loop, having a plurality of inner loops, to code for parallel execution by a multi-processor computer, by the procedure of FIGS. 8A, 8B.

DESCRIPTION OF PREFERRED EMBODIMENTS

Figure 5:
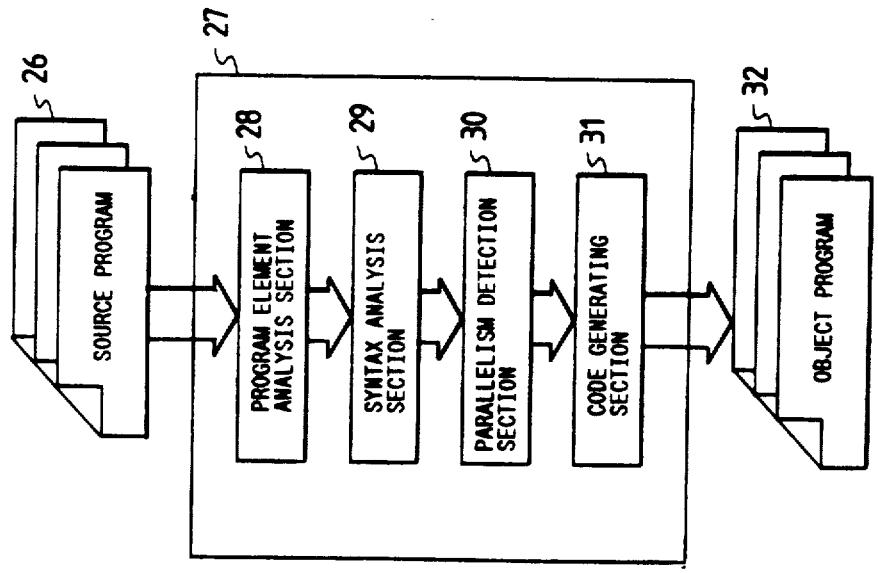
FIG. 5 is a flow diagram of an embodiment of a compiler in accordance with the method of the present invention.

FIG. 5 is a general flow diagram illustrating the basic features of an embodiment of a compiling method according to the present invention. In FIG. 5, numeral 26 denotes a source program, 27 a compiler, and 32 an object program that is generated from the source program 26 by the compiler 27. In the compiler 27, 28 denotes a program element analysis section, 29 a syntax analysis section, 30 denotes a parallelization detection section, and 31 denotes a code generating section.

Figure 7:
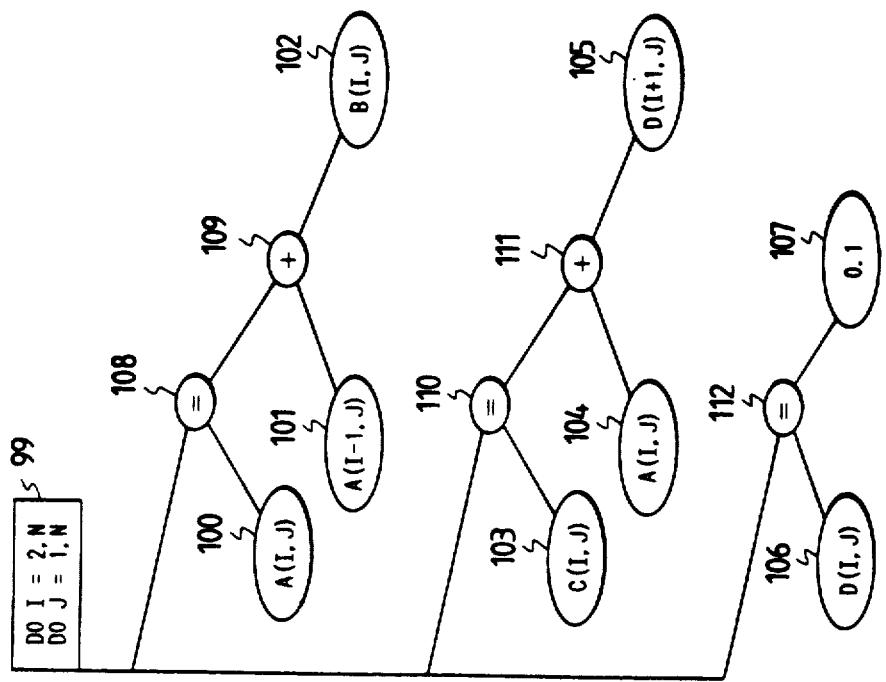
FIG. 7 is a diagram for describing conversion of a high-level language code to an intermediate code in the compiler of FIG. 5.
Figure 6A:
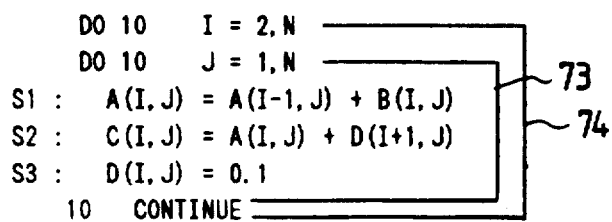
FIGS. 6A, 6B and 6C are respective examples of FORTRAN program nested loops.
Figure 6B:
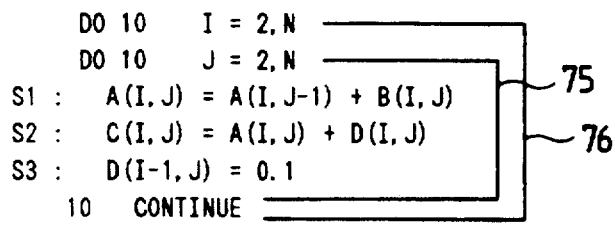
Figure 6C:
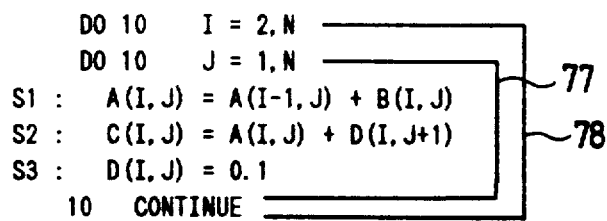

FIGS. 6A, 6B, 6C show three examples of a portion of the source program 26, each example consisting of a nested loop and being written in a high-level language which in this case is FORTRAN that is intended for use with a serial architecture computer. That is to say, each program can be directly converted to machine code for a serial architecture computer, by inputting the program to a high-level/machine code serial FORTRAN compiler. In the case of each of the program examples of FIGS. 6A to 6C, the program element analysis section 28 of the compiler 27 first analyzes the words, letters and symbols (these being referred to in the following simply as program elements) constituting each statement of the high-level program. The results of that analysis of the program elements are transferred to the syntax analysis section 29, which converts the program into intermediate code. The result of such a conversion is graphically illustrated in FIG. 7. As shown, the points at which control statements occur are defined in that intermediate code, in particular the points at which control statements for beginning a loop (i.e. one or more DO statements in the case of a FORTRAN program) are defined, as well as the relationships between variables, the indexes of array and vector variables, and the symbols ("=", "+", "*", etc.) in succeeding statements. In FIG. 7 numeral 99 indicates a portion representing two successive FORTRAN DO statements (denoting a nested loop), with that portion including the indexes I, J of array variables that will be used in the loop, and the respective initial, final, and increment values of these indexes. The remaining portion of FIG. 7 represents the contents of the nested loop. 108, 110 and 112 denote replacement operations, 109 and 111 denote arithmetic operations, and 100 to 107 denote operands, and the lines of the tree structure linking these various numerals represent the relationships between the operations and operands.

The intermediate code thus generated by the syntax analysis section 29 is then transferred to the parallelism detection section 30, in which each loop structure within the program is analyzed, to detect the presence of parallelism, i.e. to detect whether or not iterations of the loop can be executed concurrently by respective processors of the multiprocessor computer as described hereinabove for the example of FIG. 2.

Figure 8A:
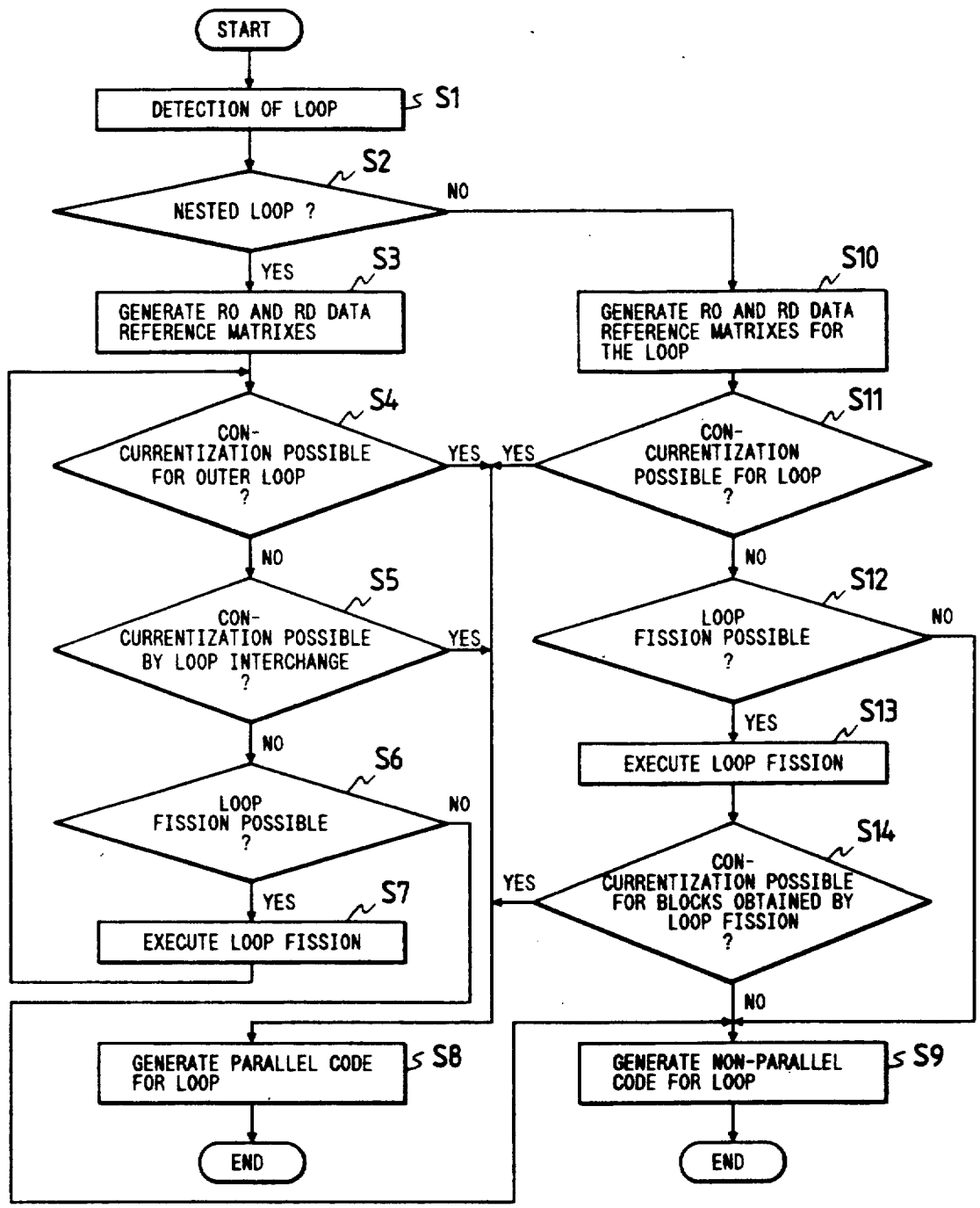
FIGS. 8A, 8B are flow diagrams illustrating the operation within the compiler of FIG. 5 of conversion of program loops to code for parallel execution by a multi-processor computer, based on intermediate code.

FIG. 8A is a flow diagram showing details of the processing sequence that is executed by the parallelism detection section 30 and code generating section 31 of the compiler 27. For simplicity of description, only the operations relating to program loops are shown. Firstly, a loop detection step S1 is executed. When a loop is detected, a step S2 is then executed to detect whether or not the loop structure is a nested loop, i.e. consisting of an outermost and at least one inner loop such as in the example of FIG. 2. If a nested loop is detected in step S2, then in step S3 a data referencing order matrix RO and data referencing direction matrix RD (described in detail hereinafter) are generated for the outermost and inner loops. Next in step S4, based on the contents of these matrixes, an analysis is made of data dependence relationships within the outermost loop of the nested loop, to determine whether the loop structure is applicable to concurrent execution, i.e. to detect parallelism. If parallelism is detected in step S4, then operation proceeds to step S8, in which parallel code is generated.

If parallelism is not detected for the outermost loop of the nested loop in step S4, then operation proceeds to step S5 in which the nexted loop is examined to check for parallelism of an inner loop, i.e. determine whether concurrentization can be made possible by interchanging the positions of the outermost loop with an inner loop, and to execute that interchange if it will make concurrentization possible.

If parallelism is detected for an inner loop, then the data dependence relationships of that loop are analyzed, to determined whether it is actually possible to execute such a loop interchange. In addition, although two consecutive initial loop control (e.g. DO) statements indicate a nested loop, there may in some cases be one or more other statements appearing in the program between these DO statements. In such a case, loop interchanging is not possible.

Figure 8B:
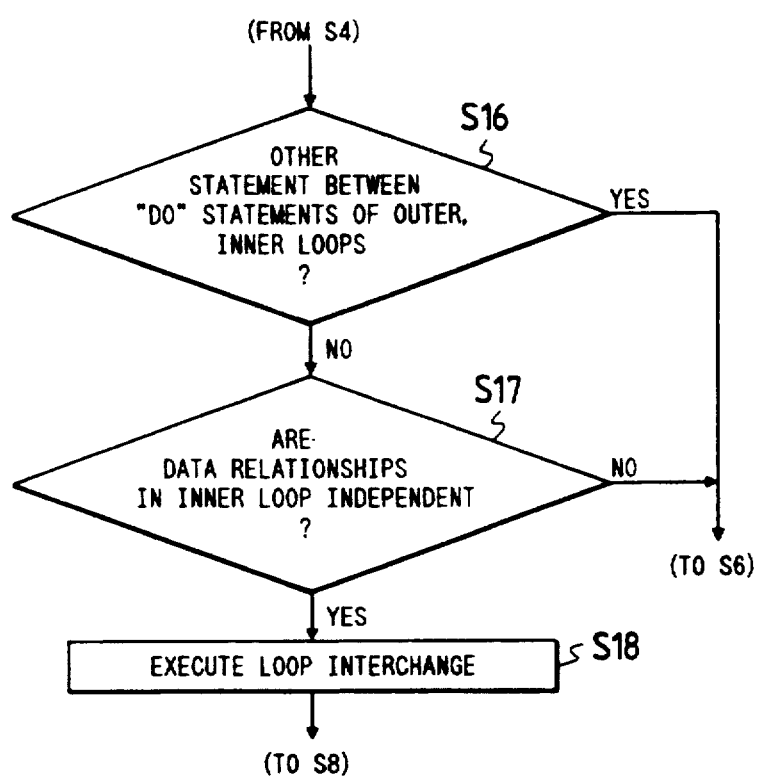

FIG. 8B is a flow diagram showing the operations that are executed in step S5 to detect whether loop interchanging is possible for an inner loop. First in step 16 the nested loop is analyzed to determine whether there is is any statement (other than a DO statement) appearing in the program between the initial loop control (e.g. DO) statement of the outermost loop and the initial loop control statement of the next inner loop. If there is a YES decision in step S16, then this indicates that loop interchanging is impossible, and so operation proceeds to step S6 of FIG. 8A. If there is a NO decision in step S16, then in step S17 a decision is made as to whether the data dependence relationships within the inner loop are independent. Here, "independent" signifies that for each variable for which a value is computed within an iteration of the loop, it must not be necessary to utilize a value for that variable that would be derived in a preceding iteration of the loop during sequential execution of that loop. If "YES", then operation proceeds to the loop interchanging step S18, and otherwise, to step S6.

If parallelism is not detected for an inner loop, then operation proceeds from step S5 to step S6, in which a decision is made as to whether or not it is possible to execute fission of the outermost loop, that is to say splitting of the nested loop into a plurality of adjacent loops, referred to as blocks. If loop fission is found to be impossible, then operation proceeds to step S9, in which non-parallel code is generated for the nested loop. If loop fission is found to be possible in step S6, then fission of the outermost loop is performed in step S7, to divide the nested loop into a plurality of adjacent loops, some or all of which may be nested loops. These loops which have been produced as a result of loop fission will be referred to in the following as blocks.

Operation then returns to step S4, and the above operations of steps S4 and subsequent are successively repeated for each of the blocks which have been produced in step S7. That is to say for each of these blocks, firstly in step S4, based on the contents of the aforementioned data referencing order matrix RO and data referencing direction matrix RD, an analysis is made of data dependence relationships within the outermost loop of the block, to judge whether or not the block can be executed by concurrent processing. If that is the case, then parallel coding is executed in step S8, if not, each inner loop of the block is examined to detect parallelism. If parallelism is detected for an inner loop of the block, and loop interchanging is found to be possible in step S5, then loop interchanging is executed in that step, and parallel coding of the block is executed in step S8. If parallel coding by loop interchanging is not possible, then the outermost loop of the block is examined in step S6 to determine whether loop fission is possible. If fission is found to be impossible, then non-parallel coding of the block is performed in step S9. If it is possible, loop fission is executed in step S7.

The above process is thus repetitively cyclically executed through the steps S4 to S7, with the number of repetitions depending upon the number of loops of the nested loop and whether or not it is necessary to execute loop fission in one or more repetitions. Assuming for example that a nested loop has been processed in steps S3, S4 to S7 and that as a result the nested loop has been divided into two blocks in step S7 and that the first of these is also a nested loop, then firstly, in step S4, the data dependence relationships within the outermost loop of that first block are analyzed. Thereafter, the processing described hereinabove for the original nested loop is executed for that first block, in steps S5 to S7. The second of the two blocks is then similarly processed in steps S4 to S7. If now the first block has itself been divided into blocks, then these will be processed in the same way, and so on until parallel and/or non-parallel code has been generated for all of the original nested loop in steps S8, S9.

It can thus be understood that if concurrent processing is possible for a nested loop (or of one or more of a plurality of blocks into which an original nested loop has been automatically divided by the operation shown in FIG. 8A) then the appropriate parallel coding will be automatically performed by the procedure shown in FIG. 8A.

If a nested loop is not detected in step S2, i.e. a loop is detected in step S1 which is a single loop, then operation first proceeds to step S10, in which the aforementioned data referencing order matrix RO and data referencing direction matrix for the loop are generated. In the succeeding step 42, the data dependence between loop iterations is analyzed, based on the dependence relationships expressed by the matrixes RO and RD, to find if concurrent execution of the loop is possible. If this is possible, i.e. parallelism is detected, then parallel code for the loop is generated in step S8. If concurrent execution is not possible, then in step S12 the loop is analyzed to determine whether loop fission can be performed. If possible, fission is then performed in step S13. Next, in a parallelism detection step S14, each of the blocks resulting from the loop interchanging is examined to determine whether or not it can be executed by concurrent processing. If it can, then parallel code for the block is generated in step S8, and if not, non-parallel code is generated in step S9.

It will be assumed that the object program that is generated by this embodiment is also written in a high-level language, e.g. the aforementioned parallel FORTRAN language which includes the "parallel DO" type of control statement. Thus although not shown in FIG. 8A, each time a loop is detected and processed as shown in FIG. 8A, then if concurrentization has been found possible, the parallel code that has been generated for the loop (in step S8) is inserted into the object program sequence to replace the original statements of that loop. If concurrentization of the loop has not been found possible, and if the language of the original statements of the loop are compatible with the high-level parallel language (e.g. parallel FORTRAN), then of course step S9 can consist of simply leaving the original statements of the loop unchanged in the object program. In that case the object program that is produced by the procedure of FIG. 8A, 8B will differ from the source program only in that parallel processing statements have been automatically inserted wherever possible.

Figure 9A:
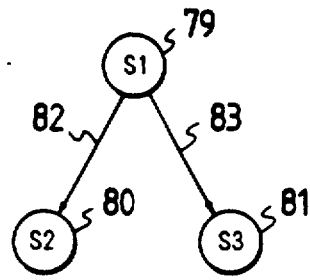
FIGS. 9A to 9C show examples of data dependence relationships within a computer program, and corresponding data dependency graphs.
Figure 9B:
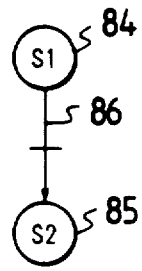
Figure 9C:
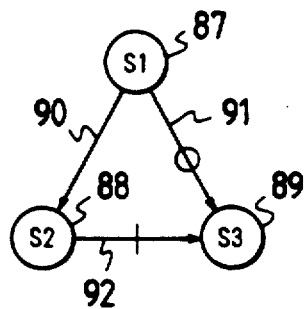

FIGS. 9A, 9B and 9C show three examples of program statement sequences and corresponding data dependence graphs which express dependence relationships between variables which occur in these statements. Such relationships are analyzed in the steps S4 and S11 of FIG. 8A described above, based on the data referencing order matrix RO and data referencing direction matrix RD. When a variable appears at the left side of a statement (i.e. to the left of the "=" symbol) then it is designated as a definition, while if a variable appears at the right side of a statement it is designated as a reference. When a variable appears twice in succession in a series of statements, then the dependence between these appearances of the variable can be either of the form (definition reference), (reference definition), (definition definition), or (reference reference). However since the condition (reference reference) does not result in any change in value, it can be ignored.

FIG. 9A shows an example of the data dependence relationship (definition reference). Specifically, the value of the variable A is defined in the statement S1, while that variable is referenced in each of the statements S2 and S3. The data dependence relationships between the statements S1 to S3 are illustrated in the data dependence graph appearing at the right side of FIG. 9A, in which the statements S1 to S3 are indicated by respective circles 79, 80, 81. In that data dependence graph, the arrow 82 indicates that there is a data dependence relationship sequence whereby a variable (i.e. A) whose value is first defined in the statement S1 is referenced in the succeeding statement S2, while the arrow 83 indicates that a variable (A) whose value is first defined in statement S1 is then referenced in the statement S3.

FIG. 9B shows an example of the data dependence relationship (reference definition). Here, the arrow 86 having a cross line indicates that the data dependence relationship order is such that the value of the variable B is referenced in the statement S1, then is defined in the succeeding statement S2.

FIG. 9C shows an example of the data dependence relationship (definition definition). Here, the arrow 91 having a circle thereon indicates that the data dependence relationship order is such that the value of the variable A is first defined in the statement S1, then is again defined in the subsequent statement S3.

Judgement as to whether concurrentization of a loop is possible, in the step S4 or S11 of FIG. 8A, is based upon whether or not any change in such data dependence relationships will occur as a result of executing such parallel processing of respective iterations of the outer loop.

Figure 10A:
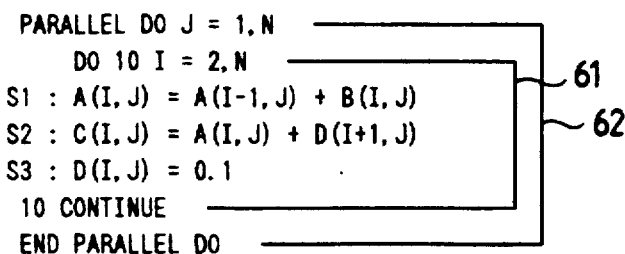
FIGS. 10A, 10B, 10C illustrate respective results of coding in a special high-level language for parallel execution by a multi-processor computer, of the program loop examples of FIGS. 6A, 6B and 6C respectively, by the process shown FIGS. 8A, 8B.
Figure 10B:
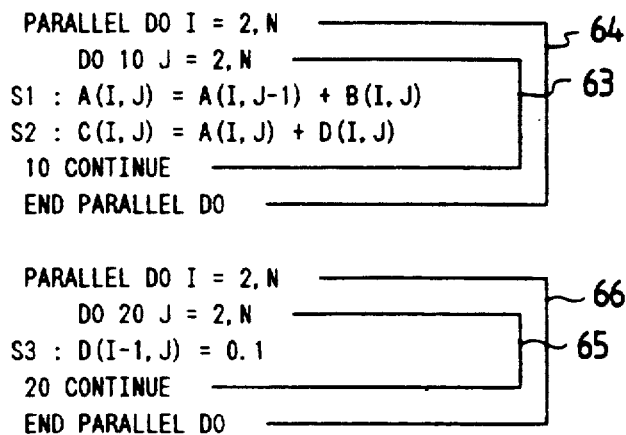
Figure 10C:
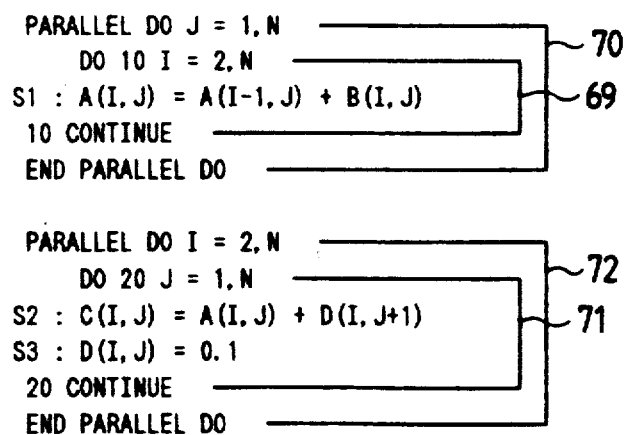

FIGS. 10A, 10B and 10C respectively show the conversion results that would be produced from applying the flow procedure of FIG. 8A to the three FORTRAN program loop examples of FIGS. 6A, 6B and 6C. As described above, it is assumed that the object program that is generated by the procedure of FIG. 8A is in a high-level language in which concurrentization has been applied to all loops wherever possible, by using in this case the "parallel DO" form of control statement. Each of the programs of FIGS. 6A, 6B, 6C is a nested loop consisting of an outermost loop and a single inner loop. Thus, for each of these program examples, it will be judged in step S2 of FIG. 8A that the detected loop is a nested loop, so that a data referencing order matrix RO and data referencing direction matrix RD will be generated for each of the loops of that nested loop, in step S3.

FIGS. 11A and 11B show the respective data dependence graphs for the outer loop and inner loop, respectively, of the program example of FIGS. 6A to 6C. As shown, these data dependence graphs for the outer and inner loops are identical in this case. FIGS. 12A, 12B show the respective data referencing order matrixes RO for the outer loop and inner loop of the program example of FIG. 6A, which correspond to FIGS. 11A, 11B respectively. In such a data referencing order matrix RO, each row and each column of the matrix corresponds to a specific program statement. For example, the first row and first column correspond to the first statement S1, and the matrix element at the junction of the first row and column (i.e. designated in the following as element $ro_{11}$) has the value 1, for both the outer and inner loops. This indicates that there is a sequential data dependence relationship from the statement S1 back to that statement S1 (since in statement S1 of the program of FIG. 6A, for both the outer and inner loops, the value of the variable A is defined and is also referenced). That value 1 of the matrix element $ro_{11}$ thus corresponds to the arrow 96 in FIGS. 11A, 11B. Similarly, the arrow 97 in FIG. 11A, 11B corresponds to the 1 value of the matrix element $ro_{12}$, and the arrow 98 corresponds to the 1 value of the matrix element $ro_{23}$. All of the other elements of each data referencing order matrix RO have the value 0.

In addition to the above, it is also possible for a data dependence relationship to extend between iterations of a loop, and to make it impossible for the iterations to be processed concurrently by a multiprocessor computer. For example, if a value of a variable in a certain iteration of a loop is determined during a preceding iteration of that loop, then of course it will be impossible to process these iterations concurrently. In the case of the program example of FIG. 6A, considering the outer loop 74, the index (I) of the array variable A which appears at the left side of the statement SI, and the index (I−1) of that variable A at the right side of the statement SI, are not identical. Thus, when the index I has some value K (where $2 < K < N$), the value of the array variable A that is referenced by the statement S1 will be the value established by the statement S1 during the preceding iteration of the outer loop 74, i.e. a value established when the value of K was (K−1). Thus, a data dependence relationship exists which extends across successive iterations of the outer loop 74.

Considering the inner loop 73 in FIG. 6A, the value of the index J of the variable A that is defined at the left side of statement S1 and the value of that index of the variable A at the right side of statement S1 will always be mutually identical. Thus when the index J of the array variable A has a value K (where $2 < K < N$), the value of the variable A that is defined in statement S1 (i.e. when A appears at the left side of the statement) will be identical to the value of the variable A that is referenced by the statement S1 when the index J has that value K. Thus, the values of the variable A, when that is defined and referenced in statement S1, are always established mutually independently, so that it would be possible to execute the iterations of the inner loop 73 concurrently by a multiprocessor computer (if that loop were actually a single loop, or the outermost loop of a nested loop).

Such data dependence relationships of a loop are expressed by the data referencing direction matrix RD, i.e. such a matrix indicates whether or not there are any data dependence relationships which link successive iterations of the loop and which would make it impossible to execute the iterations concurrently. In FIG. 13A, numerals 55, 56 and 57 denote respective data referencing direction matrixes RD for the outer loops of the program examples of FIGS. 6A, 6B and 6C respectively. In FIG. 13B, numerals 58, 59 and 60 denote respective data referencing direction matrixes RD for the inner loops of the program examples of FIGS. 6A, 6B and 6C respectively.

As for the case of the data referencing order matrixes RO, the first row and first column of and data referencing direction matrix RD correspond to the first statement of a loop, the second row and second column correspond to the second statement of the loop, and so on. Considering first the data referencing direction matrixes RD 55 and 58 for FIG. 6A, the matrix element at the junction of the first row and first column is a "<" symbol. This expresses the fact that the aforementioned data dependence relationship extending between successive iterations exists for statement S1 of the outer loop in FIG. 6A, i.e. the index values for the variable A that is both defined and referenced in that statement are such that the value of A which is referenced in that statement is defined in the preceding iteration of the loop. The value of the matrix element $rd_{12}$ is expressed by the symbol "=", which expresses the fact that, as described above, there is no data dependence relationship extending over successive iterations of the outer loop, for the variable A which appears in both the statements S1 and S2 of the loop.

The data referencing order matrixes RO for the program examples of FIGS. 6B and 6C are identical to those for the example of FIG. 6A, shown in FIGS. 12A, 12B.

It will be apparent from the above that it is possible to judge whether or not the iterations of a loop can be processed concurrently, by generating and analyzing the data referencing order matrix RO and data referencing direction matrix RD for the loop. If it is found that concurrent processing of the outer loop of a nested loop is not possible, but that such concurrent processing is is possible for an inner loop, then it may be possible to interchange that inner loop with the outer loop, to enable concurrent processing of the nested loop. Such loop interchanging is one function of the procedure of FIG. 8A described above. Alternatively, if such interchanging to enable concurrent processing is not possible, it may be possible to execute loop fission to obtain a plurality of blocks, i.e. adjacent loops as described hereinabove, each of which can then be analyzed to determine whether concurrent processing of the loop is possible, either directly, or after again performing loop interchange. This is another feature of the procedure of FIG. 8A, executed in step S7.

Figure 14:
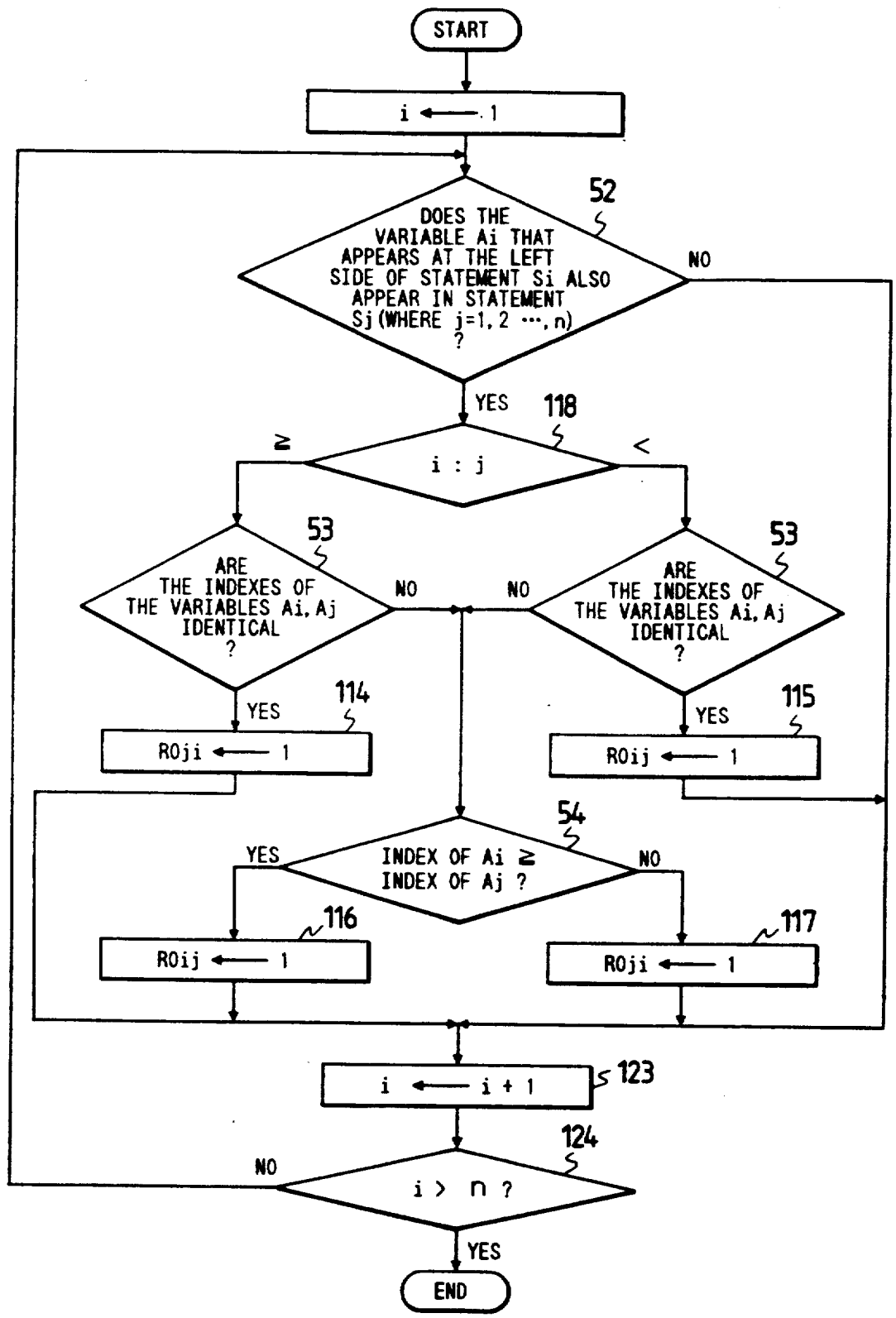
FIG. 14 is a flow diagram to illustrate a procedure for deriving a referencing order matrix.
Figure 15:
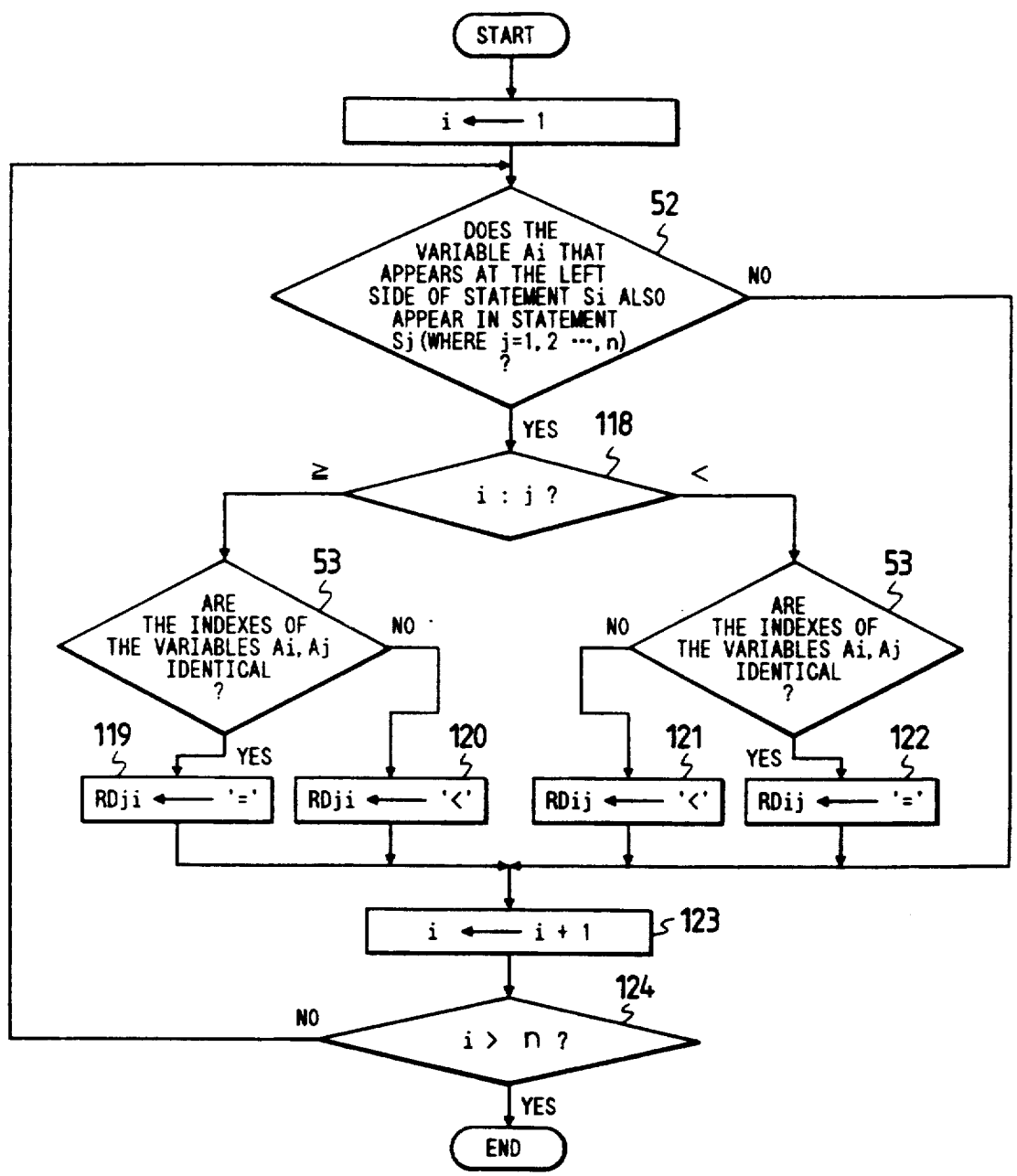
FIG. 15 is a flow diagram to illustrate a procedure for deriving a data referencing direction matrix.

FIG. 14 is a flow diagram showing the procedure for generating a data referencing order matrix RO, while FIG. 15 is a flow diagram showing the procedure for generating a data referencing direction matrix RD. In FIG. 14, it should be noted that the lower case letters i and j are used to designate index values expressing the positions at which statements appear in a successive set of n program statements constituting a loop. In the case of a nested loop, the procedure of FIG. 14 is successively applied to the outermost loop and to the inner loop (or to successive ones of the inner loops if there are more than one).

The operation flow in FIG. 14 is as follows. Firstly, the value of i is fixed as 1. Next, a step 52 is executed to judge whether a variable designated as $A_i$, which appears at the left side of the statement $S_i$, also appears at the left or right side of a statement $S_j$ of the loop, where j takes the values 1, 2, . . . , n, i.e. a search is made to detect if the variable that is defined by the statement $S_i$ is also referenced in that statement, or is defined or referenced in any other statement of the loop. A decision is thereby made, in step 52b, as to whether such a common variable has been found. If it is found that the variable that is defined in statement $S_i$ does not appear again in the statements of the loop, then operation proceeds to step 123, in which the value of i is incremented by one. If it is found that the variable that is defined in the statement $S_i$ is also referenced in that statement, or appears in any subsequent statement, then the operation proceeds to step 118, in which the respective magnitudes of the values i and j are compared. A step 53 is then executed, to judge whether or not the variable has the same magnitude of index in each of its appearances in the statements. If it is found in step 118 that the value of i is greater than or equal to that of j, and it is found in step 53 that the variable $A_i$ has the same magnitude of index each time that it appears, then in step 114, the value of the matrix element $ro_{ji}$ of the data referencing order matrix RO for that loop is set to 1. If on the other hand it is found in step 118 that the value of i less than that of j, and it is found in step 53 that the variable $A_i$ and $A_j$ have the same magnitude of index, then in step 115, the value of the matrix element $ro_{ij}$ of the data referencing order matrix RO for that loop is set to 1.

If it is found in step 53 that the index magnitudes of the variable $A_i$ and variable $A_j$ are different (for example in the outer loop of the program example of FIG. 6A, the magnitude of the index of the variable A at the right side of statement S1, i.e. I−1, is less than that of the index of the variable A at the left side of that statement, i.e. I), then operation proceeds to a step 54, in which the relative magnitudes of the index are compared.

If it is found in step 54 that the magnitude of the index of $A_i$ is greater than or equal to the index of $A_j$, then the value of the matrix element $ro_{ij}$ of the data referencing order matrix RO is set to 1, in step 116. If it is found that the magnitude of the index of $A_i$ is less than the index of $A_j$, then the value of the matrix element $ro_{ji}$ is set to 1, in step 117. After any of the steps 114, 115, 116 or 117, the value of i is incremented, and a decision is made as to whether i has reached the value n, i.e. as to whether the final statement of the loop has been examined, in step 124, and if i is not greater than n then the above process is repeated from step 52. For ease of understanding, the step 53 appears twice in FIG. 14.

The procedure for deriving the data referencing direction matrix RD, shown in FIG. 15, is almost identical to that of FIG. 14, so that detailed description will be omitted. The magnitudes of i and j are compared in step 118, and if i is equal to or greater than j then the indexes of the variables $A_i$ and $A_j$ are examined. If the indexes are the same, then the matrix element $rd_{ji}$ is set to the value "=" in step 119, while if the indexes are mutually different, then value of $rd_{ji}$ is set to "<", in step 120.

If it is found that the value of i is less than that of j, in step 118, then in that case too, the indexes of $A_i$ and $A_j$ are examined. If the indexes are the same, then the matrix element $rd_{ij}$ is set to the value "=" in step 122, while if the indexes are mutually different, then the value of the matrix element $rd_{ij}$ is set to "<", in step 121.

The above processing is executed for each statement of the loop, by successively incrementing the value of i in step 123, and the processing is repeated for each of the statements of the loop until the final statement $S_n$ has been examined.

By applying the procedure of FIG. 14 to the nested loop program examples of FIGS. 6A to 6C, the data referencing order matrixes RO of FIGS. 12A, 12B are obtained for the outer and inner loops respectively of each program example. In addition, by applying the procedure of FIG. 15 to the nested loops of FIGS. 6A, 6B and 6C, the data referencing direction matrixes RD 55, 56 and 57 are obtained for the respective outer loops of these, and the data referencing direction matrixes RD 58, 59 and 60 for the respective inner loops.

In the case of the outer loop 74 of the nested loop program example of FIG. 6A, the variable A(I,J) which appears at the left side of the statement S1 also appears on the right sides of each of the statements S1 and S2. The index of the variable A appearing on the right side of the statement S1 is (I−1), which is thus different from the index of the variable A appearing at the left side of statement S1. Thus, the matrix element $ro_{11}$ of the data referencing order matrix RO for the outer loop takes the value 1, and the matrix element $rd_{11}$ of the data referencing direction matrix RD of the outer loop (i.e. the matrix 55) takes the value "<".

Similarly, the index I of the variable A appearing in the right side of the statement S2 for the outer loop in FIG. 6A, is identical to that of the variable A at the left side of statement S1. Thus, the matrix element $ro_{12}$ of the data referencing order matrix RO of FIG. 12A takes the value 1, and the matrix element $rd_{12}$ of the RO matrix 55 in FIG. 13A takes the value "=". In addition, the variable D appears at the right side of the statement S2 and also at the right side of the statement S3. The magnitude of index for the outer loop is not the same in each case, i.e. the magnitudes are I+1 and I respectively, so that the magnitude of the index of the variable D appearing in the statement S2 is greater than that of the index of that variable appearing in the statement S3, the matrix element $ro_{23}$ in FIG. 12A is set to the value 1, and the element $rd_{23}$ in the RD matrix 55 is set to the value "<".

The matrixes RO and RD for the inner loop of the program example of FIG. 6A and for the outer and inner loops of each of the examples of FIGS. 6B and 6C are derived in the same way as described above for the outer loop of the example of FIG. 6A.

When the matrixes RO and RD for a loop have been derived as described above (step S3 in FIG. 8A), a decision can be made as to whether or not the loop is applicable to parallel processing (step S4 in FIG. 8A). Specifically, if all of the elements of the data referencing direction matrix RD for that loop have the value "=" (or "0"), then this indicates that the iterations of the loop have mutually independent data dependence relationships, so that the loop is applicable to concurrent processing as described hereinabove referring to FIG. 3, if it is a single loop or is the outermost loop of a nested loop. If however there is at least one matrix element in the matrix RD which is "<", then this indicates that there is a data dependence relationship which extends between successive iterations of the loop, so that the loop cannot be executed by parallel processing. Thus for example as shown in the data referencing direction matrix RD 55 of FIG. 13A, the outer loop 74 of the nested loop of FIG. 6A is not applicable to parallel processing (as would be judged in step S4 of FIG. 8A). However as shown by the data referencing direction matrix RD 58 for the inner loop of that example, since that matrix contains no "<" elements, parallel processing could be applied if the inner and outer loops 73, 74 were interchanged (as would be judged in step S5 of FIG. 8A). The nested loop is then analyzed (step S5 in FIG. 8A) to determine whether or not loop interchanging is possible for that nested loop. If, as is the case for the example of FIG. 6A, loop interchanging is possible, then interchange is performed. The nested loop now has an outer loop for which the data referencing direction matrix RD contains no "<" elements, while in addition there is no other statement positioned between that outer loop and the next inner loop, so that the program portion constituting that nested loop can now be coded for parallel execution (step S8 in FIG. 5).

FIG. 10A shows the result of that concurrency coding, assuming for ease of understanding that the result is written in the special FORTRAN language for parallel operation, mentioned hereinabove. This signifies that the N iterations of the outer loop 62 will be executed concurrently, by respective processors of a multiprocessor computer, with the iterations of the inner loop 61 being executed successively. In the case of the nested loop program example of FIG. 6B, the corresponding data referencing direction matrixes RD 56 and 59 for the outer loop 76 and inner loop 75 each contain a "<" element, so that it will be determined in step S5 of FIG. 8A, as these loops are respectively analyzed, that neither of these is applicable to parallel execution. In step S6, it will be judged that the outer loop 76 can be divided into blocks, i.e. fission can be applied to that loop. The loop fission is performed in step S7. In the first row of the data referencing direction matrix RD 56 for the outer loop, only the "=" value appears, for each of the elements $rd_{11}$ and $rd_{12}$, while in the second row of that matrix, the "<" value appears for the element $rd_{23}$. This indicates that it is necessary to form a single block that contains only the statements S1 and S2, and to form a separate block containing only the statement S3. The data dependence relationships for the outer loop of the resultant block formed of statements S1, S2 and for the outer loop of the block formed of statement S3 are then respectively analyzed (in step S4 of FIG. 8A). It will now be found that both of these outer loops applicable to parallel execution (i.e. the data referencing direction matrix RD of the outer loop of each block contains no "<" element), so that concurrent code for each of these blocks will be generated in step S8 of FIG. 8A. The results, after coding into concurrent FORTRAN language (in step S8 of FIG. 8A) are shown in FIG. 10B. As shown, the original nested loop has been divided into a first block which is a nested loop consisting of outer and inner loops 64, 63, and a second block which consists of inner and outer loops 65 and 66 respectively. During execution of these blocks, the iterations of the outer loop 64 will first be processed concurrently (i.e. with sequential processing of the inner loop 63) by respective processors of the multiprocessor computer, then the iterations of the outer loop 66 will similarly be processed concurrently (with sequential processing of the inner loop 65).

In the case of the nested loop example of FIG. 6C, since the data referencing direction matrix RD of the outer loop 76 includes a "<" element as shown in matrix 57 of FIG. 13A, it is found in step S4 of FIG. 8A that parallel execution of that outer loop is not possible, and it will be similarly found in step S4 that concurrent execution would also be impossible even if loop interchange were to be performed (since the data referencing direction matrix RD 60 for the inner loop 77 includes a "<" element). It is then found that loop fission is possible, and so fission is performed (in step S7 of FIG. 8A) into a block containing the statement S1 and a block containing the statements S2, S3. Steps S4 and S5 are then repeated for each of these blocks. As a result, it will be found in step S5 that while the outer loop of the block formed of statements S2, S3 will enable parallel execution, the parallel execution is not possible for the outer block of the other block. However it is found that loop interchanging will enable parallel execution of that other block, and after loop interchanging is judged to be possible for that block (in step S5), it is performed. The result, after coding in concurrent FORTRAN language, is as shown in FIG. 10C. Here, the first block has been derived by loop fission followed by loop interchanging as described above, to obtain the inner and outer loops 69, 70 respectively. The second block, formed of inner and outer loops 71 and 72 respectively, has been derived only by loop fission, so that the order of the PARALLEL DO statements is identical to that of the original program of FIG. 6C.

If it is found in step S2 of the procedure of FIG. 8A executed by the compiler 27 that a loop has been encountered in the program sequence, but that the loop is not a nested loop, then in the same way as for a nested loop a data referencing order matrix RO and a data referencing direction matrix RD for that loop are generated in step S10. The loop data dependence relationships are then analyzed in step S11 to determine whether concurrentization of the loop is possible. If it is found that concurrentization is not possible, then a decision is made as to whether fission of the loop into blocks is possible (step S12), and if it is possible, fission is performed (step S13). Each of the resultant blocks is then analyzed to judge whether or not concurrentization can be applied. If so, parallel coding is performed in step S8, if not, then non-parallel coding is performed in step S9.

Figures 16, 17:
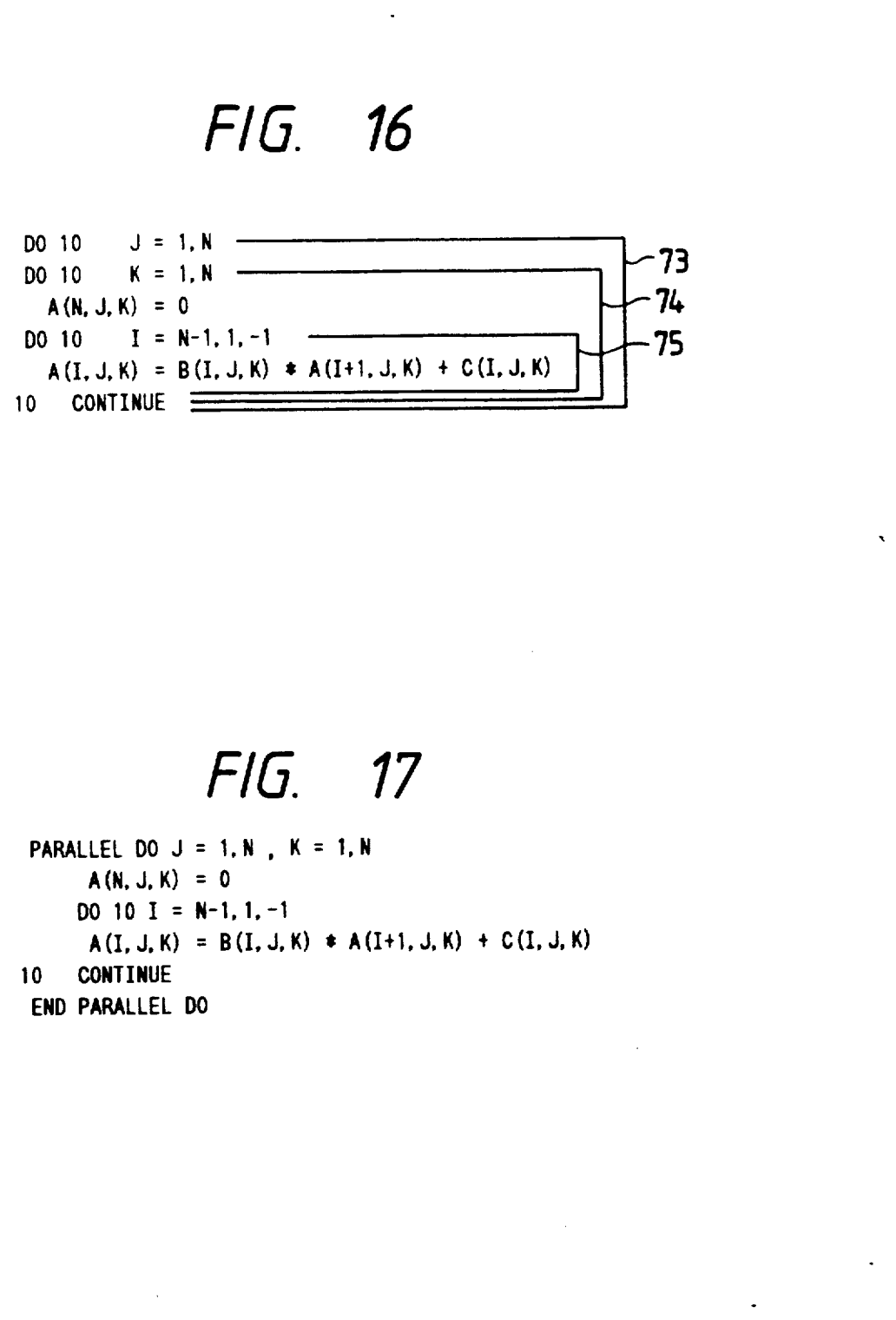

The above description has been given only for the case of a single loop or a nested loop formed of only two loops. However the procedure described above is also valid for a nested loop consisting of three or more loops. An example of such a nested loop is shown in FIG. 16, consisting of outer loops 73, 74 which are tightly linked (i.e. with no statement appearing between the initial control (DO) statements of these loops, in the program sequence), and an inner loop 75, with a statement inserted between that inner loop 75 and loop 74. The result of subjecting that program example to the procedure of FIG. 8A by the compiler 27 will be as shown in FIG. 17.

It can be understood from the above description that the compiling method of the present invention enables the large amount of software that is already available for use with serial architecture computers to be rapidly converted for application to parallel architecture computers, and can enable increased efficiency in developing new software for parallel processing applications.

What is claimed is:

1. A processor scheduling method for iterative loops, for a compiler which generates from a source program an object program to be executed by a parallel computer system formed of a plurality of processors having an ability to concurrently execute instructions by performing processing in parallel, the method including successively a step of analyzing program elements of source code of said source program, a step of analyzing syntax of said source program based on results obtained from said step of analyzing program elements to thereby generate intermediate code, a parallelism detection step of analyzing said intermediate code to detect program loops and to judge whether concurrent execution of a detected program loop is possible, and a coding step for generating code of said object program in accordance with results obtained in said parallelism detection step; wherein said parallelism detection step comprises successive steps of:
   (a) analyzing a detected program loop to detect whether said detected program loop is a nested loop and, if a nested loop is found:
   (b) analyzing data dependence relationships within respective loops constituting said nested loop, to detect a loop for which no data dependency relationships exist;
   (c) if a loop is detected for which no data dependency relationships exist, making said loop an outermost loop of said nested loop; and
   (d) scheduling iterations of said loop for which no data dependency relationships exist, to be executed by respective ones of said plurality of processors of said parallel computer system.

2. A processor scheduling method according to claim 1, wherein if a nested loop is found in said step (a) of the parallelism detection step, iterations of an outermost loop of said nested loop are schedules to be executed by respective ones of said plurality of processors of said parallel computer system only if said outermost loop is in a tightly linked relationship within said nested loop.

3. A processor scheduling method according to claim 2, wherein if a nested loop is found in said step (a) of the parallelism detection step, said outermost loop of the nested loop is divided into a plurality of adjacent loops, and wherein for each of said plurality of adjacent loops, iterations are scheduled to be executed by respective ones of said plurality of processors of said parallel computer system.

4. A processor scheduling method for iterative loops, for a compiler which generates from a source program an object program to be executed by a parallel computer system formed of a plurality of processors having an ability to concurrently execute instructions by performing processing in parallel, the method including successively a step of analyzing program elements of source code of said source program, a step of analyzing syntax of said source program based on results obtained from said step of analyzing program elements, to thereby generate intermediate code, a parallelism detection step of analyzing said intermediate code to detect program loops and to judge whether concurrent execution of a detected program loops is possible, and a coding step for generating code of said object program in accordance with results obtained in said parallelism detection step; wherein said parallelism detection step comprises successive steps of:
   (a) detecting whether said detected program loop is a nested loop and, if a nested loop is found:
   (b) detecting a loop constituting said nested loop for which no data dependency relationships exist;
   (c) if a loop is detected for which no data dependency relationships exist, making said loop an outermost loop of said nested loop; and
   (d) scheduling iterations of said loop for which no data dependency relationships exist, to be executed by respective ones of said plurality of processors of said parallel computer system.

* * * * *